United States Patent [19]

Riederer

[11] 4,367,490
[45] Jan. 4, 1983

[54] NOISE REDUCTION IN DIGITAL FLUOROSCOPY SYSTEMS

[75] Inventor: Stephen J. Riederer, Wauwatosa, Wis.

[73] Assignee: General Electric Company, Schenectady, N.Y.

[21] Appl. No.: 257,447

[22] Filed: Apr. 24, 1981

[51] Int. Cl.³ .............................................. H04N 5/21
[52] U.S. Cl. .................................... 358/167; 358/111; 378/99
[58] Field of Search ................. 358/111, 167, 166, 36, 358/37, 105; 378/99

[56] References Cited

U.S. PATENT DOCUMENTS 4,246,610  1/1981  Takahashi ............................ 358/167
4,296,436  10/1981  Achida ................................. 358/167

Primary Examiner—John C. Martin
Assistant Examiner—Edward L. Coles
Attorney, Agent, or Firm—Ralph G. Hohenfeldt

[57] ABSTRACT

Apparatus for reducing the effect of x-ray statistical noise and electronic noise in a fluorographic system that displays an x-ray image on a television screen. Analog video signals based on the x-ray image are amplified logarithmically and digitized to yield live pixel signals. Processed pixel signals are averaged in a full image store or memory. Motion is detected by subtracting the stored pixels from the live pixels on a pixel-by-pixel basis in an ALU. The difference resulting from subtraction is used as part of an address to a look-up table (LUT) which contains values equivalent to the difference signals times a noise reduction multiplicative factor, K. The other part of the addresses is the live pixel value. There are several replications of the look-up tables each relating to a particular brightness level range. The one selected is determined by the live signal part of the address which relates to brightness. The K times the difference signals in the ranges are chosen so the amount of noise reduction varies with brightness level as desired for logarithmic signals. The pixels processed as explained above are added in-phase with the stored and averaged pixels and returned to the corresponding full image memory locations.

10 Claims, 3 Drawing Figures

NOISE REDUCTION IN DIGITAL FLUOROSCOPY SYSTEMS

BACKGROUND OF THE INVENTION

This invention pertains to reducing the effect of noise in video systems. The principles of the improved noise reduction means will be illustrated herein primarily as they are implemented in digital x-ray fluoroscopic video display systems.

In the system in which the improved noise reduction means is exemplified the beam from an x-ray source is projected through an object such as a body under examination and the image produced thereby is intercepted by an image intensifier. The image intensifier converts the x-ray image to an optical image. The optical image is received by a television camera which converts it to the usual video signal waveforms on a line-by-line basis. The amplitude of the video signal derived from an x-ray image varies linearly with brightness of the x-ray image. Hence, in order to obtain a linear relationship between signals corresponding to image brightness and object thickness, the video signals must be amplified logarithmically. After logarithmic amplification, the analog video signals are converted to digital data. There is a digital number or value for each picture element (pixel) derived from the analog video signal. The digital data are processed, stored in a full image memory and ultimately used to drive a television monitor that enables the radiologist to view an optical replica of the x-ray image.

As is well known, it is desirable to take measures to improve the signal-to-noise ratio in ordinary monochrome and color television systems and in x-ray fluorographic television display systems as well.

Several schemes have been proposed for noise reduction or signal-to-noise ratio improvement in monochrome and color television systems. A noise reduction system for commercial television systems that is believed to be particularly effective is described in U.S. Pat. No. 4,064,530. However, the patented system does not fulfill some of the requirements of analog and digital x-ray fluorographic television display systems. In medical fluoroscopy, where logarithmic amplification is used, the noise level changes with the useful video signal level. In the logarithmically amplified signal, the noise is generally greater in the dark portions of the image and smaller in the whiter portions. Thus, it has been found to be desirable to provide for greater noise reduction in the darker than in the whiter regions, but, insofar as is known, this has not been achieved heretofore.

The method described in the cited patent is based on the fact that the useful video signals occur substantially periodically whereas noise occurs randomly. The system uses a full image memory or digital frame store for the digitized pixels making up the successive television frames. For fluorographic purposes, there might be, typically, 512 rows of pixels in each line and 512 lines comprising a television frame. The frame store or memory acquires and the system processes video images at the standard rate of 30 frames per second so the image can be displayed on a television monitor at standard television rates.

The noise reduction system in the cited patent is based on averaging respective digitized pixel signals for many television frames on a continuous basis and reading out the average pixel values from the frame store for conversion to analog equivalents and for display by the monitor thereafter. Because averaging tends to cancel noise, the averaged image appears less noisy on the monitor display screen.

In the cited patent, averaging is done recursively. In general, a controllable fraction of each digitized stored pixel is added to a controllable fraction of the digitized or real-time live video image coming from the video camera or a tape recorder. The result is restored to the frame store memory pixel locations and is repeated at the video frame rate every 1/30 of a second. The prior system detects motion in individual pixels by detecting the difference between the magnitude of the stored and live images on a pixel-by-pixel basis. For various differences below a threshold value, the fraction added varies with the value of the difference. If the detected difference exceeds threshold, the averaging process is turned off for that pixel and the live pixel merely replaces the stored pixel value as output from the digital frame store. If the live pixel were not sent through unmodified when there is motion, the moving edges in the displayed image would have long trailers behind them, thus exhibiting a smeared image.

Since in the patented system the fraction of the live and stored pixel value used depends on the difference between the live and stored or averaged pixel values, when there is substantial motion of an object in an image scene relative to background, there would be a great difference between the live video signal and the stored averaged pixel values along the edge of the moving object so noise reduction is decreased for the pixels in motion. In the extreme case noise reduction by averaging is completely eliminated so the live pixel corresponding to the edge of the object itself is displayed rather than some modified difference between the live and stored video signals.

There is a reason for discontinuing averaging and letting the live video signal come through when there is motion. The reason can be appreciated if one recognizes that the averaged pixels are stored in a format such as a 512×512 format, by way of example. If the image has been static for a period of time the valid or useful video signal and the noise components will be averaged and be represented by the existing digital value of the pixels accumulated during a succession of television frames. Now consider any one of the pixels at the edge of an object which can move in the scene. Since the live and stored or averaged pixels that correspond are subtracted on a pixel-by-pixel basis, the single pixel under observation at the edge of the object which coincides with a corresponding averaged value during one frame will be in coincidence with a different averaged value during the next successive frame. Thus, the moving pixel which truly corresponds with the edge of the moving object would have successively different averaged values subtracted from it and smearing of the displayed image would result. Hence, live pixels are allowed to come through unmodified or without noise reduction at the edges of any object whose motion has been detected.

SUMMARY OF THE INVENTION

A primary object of the present invention is to provide noise reduction means for a video system which not only varies the amount of noise reduction inversely with the amount of motion of an object in the image field but also varies the amount of noise reduction in proportion to the brightness or, conversely, the darkness in portions of the image to thereby provide a suitable noise reduction system for use in digital fluoroscopy where the video input signals are amplified logarithmically and in ordinary video systems where the video signals are amplified linearly.

The manner in which the foregoing general object is achieved will be evident in the more detailed description of an illustrative embodiment of the invention which will now be described in reference to the drawings.

DESCRIPTION OF A PREFERRED EMBODIMENT

Figure 1:
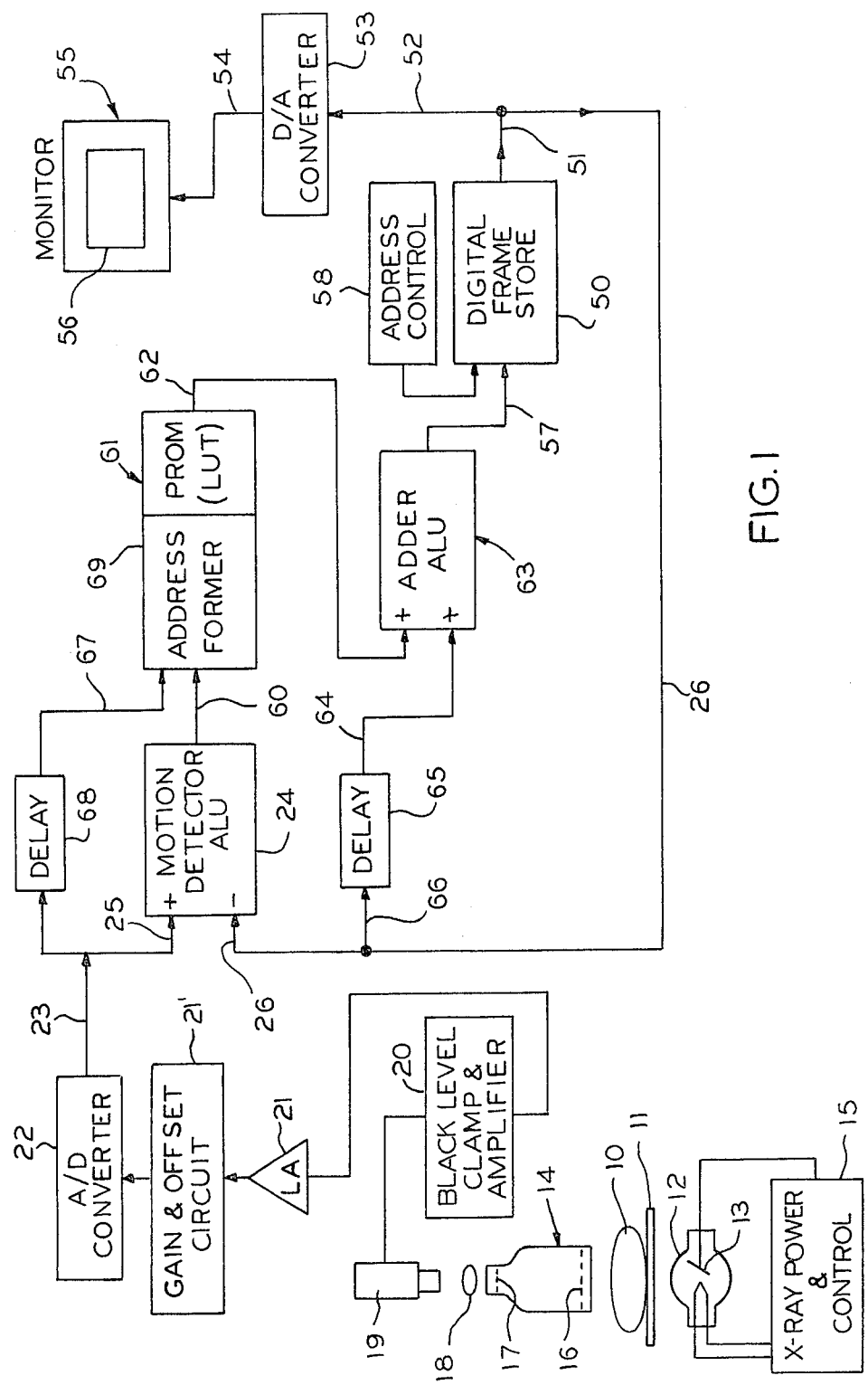
FIG. 1 is a block diagram of a preferred embodiment of noise reducing apparatus for an x-ray fluorographic system.

A diagnostic x-ray system with which the noise reduction system may be used is depicted in the left region of FIG. 1. The patient undergoing examination is represented by the body marked 10. The patient is supported on an x-ray transmissive table top 11. An x-ray tube 12 is mounted beneath table top 11 for an x-ray beam to be projected from a focal spot on its anode 13 through the table top and patient toward an x-ray image intensifier 14. A conventional x-ray power supply and control for energizing the x-ray tube is symbolized by the block marked 15. Image intensifier 14 may be a conventional type having an x-ray image input screen or photocathode represented by the dashed line 16. The image intensifier converts the x-ray image to an electron image and then to an optical image which appears on a phosphor screen represented by a dashed line marked 17. An objective lens 18 is disposed in the optical path. A television camera 19 views the optical image and converts it to a train of analog video waveforms which are input to a black level clamp and amplifier circuit represented by the block marked 20 which circuit is used commonly enough in the television art to preclude the need for describing it. The output from black level clamp 20 is input to a logarithmic amplifier 21 in this particular example. The components of the x-ray system and the video camera thus far described are known to those who are involved in the digital fluoroscopy field. The video camera may produce successive fields which are interlaced to form frames at a rate of 30 per second in a system based on 60 Hz power line frequency. As indicated earlier, the new noise reduction means which is to be described later can be beneficially used in ordinary video systems where image brightness depends on factors other than object thickness. In such case there is a linear relationship between image brightness and video signal magnitude so a linear amplifier, if any, would be used in place of logarithmic amplifier 21.

As is known to x-ray physicists, there is not true linear correspondence between video signal amplitude and object thickness when a video camera detects an image that is based on an x-ray beam penetrating an object such as the human body. The lack of linearity results from exponential attenuation of the x-ray beam by the object. Hence, to obtain a substantially linear relationship between object thickness and video signal amplitude, the video signal is amplified logarithmically such as in amplifier 21. As is customary, there is a gain and offset adjust circuit, represented by the block marked 21', between the amplifier 21 and the A/D converter for reasons that are known to those familiar with the television art. The logarithmically amplified signal output from circuit 21' is then input to an analog-to-digital (A/D) converter that is symbolized by the block marked 22. By way of illustration and not limitation, the analog values may be converted to 10-bit pixel signals which would be output from the converter 22 on line 23. 10-bit signals would provide 1,024 brightness gradations which would be more than the eye can perceive. Digitizing to 8-bits or 256 gradations will generally be satisfactory.

The output from A/D converter 22 is input to the signal processing, noise reducing and image display system illustrated in FIG. 1. It may be noted at this time that there is a digital frame store or full image memory in the output stage of the system and it is symbolized by a block marked 50. Typical of memories used for storing pixel signals representative of an x-ray image, image memory 50 may have 512 rows and 512 columns of locations for storing digital values corresponding to the pixels making up a frame. The pixels are read out row after row and sent by way of lines 51 and 52 to a digital-to-analog converter 53 where they are converted to corresponding analog video signals again and delivered by way of a line 54 to a television monitor 55 for viewing on its screen 56.

For the time being, and disregarding the matter of motion, one may look upon the digital frame store 50 as being operative to average the individual digitized pixel signals over a succession of frames with the earlier frames having less and less weight than the later and last frames. Of course, the valid or useful part of each pixel signal and the noise will be averaged. However, since noise is random it will tend to cancel and make less and less contribution to the accumulated or averaged signal as time goes on. Averaging signals to reduce the effect of noise is known to those skilled in the art. It will be understood that the digital frame store requires proper addressing of the pixel signals coming in on its input line 57. The address control associated with such stores or memory is conventional and is simply represented by the block marked 58.

As indicated earlier, requirements of the system are to detect motion in the scene being imaged and to reduce the noise reduction by a large amount when significant motion is detected and to increase noise reduction for decreasing amounts of motion. The significant improvement of having noise reduction varied in accordance with the brightness of the pixels will be discussed later. How motion is detected in the present system will now be discussed.

In FIG. 1, an arithmetic logic unit (ALU) represented by the block marked 24 is used to detect motion in the x-ray image. For instance, in a medical application, it could be the wall of a beating heart that exhibits motion in a field comprised of other soft tissue and bone. The ALU 24 is used to compare or subtract signals and output the result. One of its input lines 25 is for input of the successive 10-bit digital words representative of the live pixel signal magnitudes coming in from A/D converter 22. There is a feedback line 26 from the output of the digital frame store 50 and it constitutes the other input to ALU 24. The averaged digital signals are read out on a pixel-by-pixel basis row after row from the digital store 50 and supplied by way of feedback line 26 to said other input of the ALU 24 in correspondence with the live digitized video signals coming in on line 25 which will ultimately be assigned to the location in the store 50 from which the averaged value on line 26 is derived. In other words, the live and averaged video signals are supplied in-phase to the motion detector ALU 25 wherein each averaged pixel signal is compared with or subtracted from a corresponding live pixel signal. For pixels that do not correspond to motion, there will be little difference between the live and averaged values and then only a fraction of the live video signal will be added to the stored video signal.

ALU 24 continues to compare pixel after pixel coming in on line 26 from consecutive locations in the digital frame store 50 with corresponding live digitized pixel signals coming in on input line 25. Whenever a difference is detected between a live pixel coming in on line 25 and a corresponding stored or averaged pixel value from the frame store on its line 26, motion in the x-ray image is indicated and the system of FIG. 1 responds by varying the amount of noise reduction in the signal in proportion to the difference. If the difference between the live pixel value and the corresponding stored or averaged value reaches a threshold value, large motion is indicated and the live pixel signal is simply permitted to go through and replace the averaged value for that pixel location in the frame store. This avoids the previously discussed streaking or trailer effect in the displayed image adjacent the moving edge. Thus, there is little or no noise reduction for pixels which are involved in motion but it makes no difference since the eye cannot detect the noise at the edge of a moving element anyway.

The noise reduction process, in accordance with the present invention can be characterized by the following equation:

$$Store_n = (1-K)Store_{n-1} + K(Live_n)$$

In this equation $n-1$ designates the frame in which the stored image is generated. $Live_n$ is the frame time in which the live image is being read out. K is a multiplication factor or controllable fraction that determines how much noise reduction occurs. It is desired to compute the stored pixel values for frame n and for that same frame resulting from processing in frame n. Thus, the equation states that the stored image for frame n is equal to another controllable fraction $(1-K)$ times the stored image of the previous frames plus K times the live image from the present frame.

The foregoing equation is rewritten to make K apply to both the stored and live pixels in a frame as follows:

$$Store_n = Store_{n-1} + K(Live_n - Store_{n-1})$$

In the foregoing equation the variable multiplication factor or controllable fraction K will have a value between 1 and 0. If $K=1$, then the live video signal, $(Live_n)$, replaces $Store_{n-1}$ in the digital frame store location that is being read out at the moment. $(Live_n - Store_{n-1})$ is the output and result of the comparison made in motion detector ALU 24. As K decreases the amount of noise reduction increases. In the circuit described herein, K could have a different value for every pixel. In other words, by performing the subtraction in the ALU 24 for every coexisting live and averaged pixel, a unique value for K may be chosen for every pixel. If, by way of example, the incoming video signals were digitized to 8-bit binary numbers, 256 different values of K could be obtained if desired. If, by way of further example, video signals were digitized to 10-bit binary numbers, 1024 different values of K could be obtained. There does not have to be a unique value of K for every computed difference between the live and the stored pixel signals. A single value of K can be used for a range of live and stored signal differences, for instance. In some prior art systems, as few as 4 or 6, for example, values of K are used for the entire range of computed differences.

Consideration will now be given to how K is developed in the FIG. 1 diagram. As has been explained, the output on line 60 from motion detector ALU is a signal resulting from comparing the live video signal input line 25 with the stored pixel value on line 26. What remains to be done is to generate the whole second term of the last equation given above, $K(Live_n - Stored_{n-1})$. K is generated in this implementation in a programmable read-only memory (PROM) which is generally designated by the reference numeral 61. It contains a look-up table (LUT) which permits loading functions into it, one of which would be the results of comparison, that is, Live-Stored, and it uses that input value as part of an address to look up a value of K and provides an output on line 62. Live pixel signals are also simultaneously loaded into the look-up table by way of line 67 for reasons which will be discussed later. Since K is a multiplier for $(Live_n - Stored_{n-1})$ it can be incorporated in the look-up table. Thus, the two steps are caused to occur together in one look-up table. The output on line 62 can then be K times Live-Stored rather than simply K. This provides the whole second term of the equation.

By way of example, let us suppose that the Live-Stored value is equal to decimal 10. The LUT would then output $10 \times K$ on line 62 where K is a number that has been arbitrarily chosen but has a value between 0 and 1. The number of locations in the LUT as a practical matter sets the number of K values that would be obtainable. However, to deal with a practical size PROM fewer values of K could be elected. A value of K can be applied to a range of Live-Stored values, for instance. This will be discussed in greater detail later in connection with FIG. 3.

To complete equation 2, it is now necessary to sum the first term or the stored value $(Store_{n-1})$ of the pixel to the second term of the equation whose development has just been discussed in the preceeding paragraph. Summing of the two terms of the equation is done in an adder ALU which is generally designated by the reference numeral 63. The stored or averaged video signal, that is, the first term of the equation is input to adder ALU 63 by way of a line 64 which is output from a delay device symbolized by the block marked 65. The input line 66 to the delay device for the stored video signal connects to line 26 from the output 51 of the digital frame store 50. As indicated earlier, the pixels are read out synchronously from the digital frame store so, by way of example, pixel 1 from the store and pixel 1 from the live video signals both appear at the inputs of adder ALU 63 at the same time. This is true of all pixels in succession. A delay is necessary because it takes some finite amount of time for the live video signal to propagate through the motion detector ALU 24 and the PROM or LUT 61. In any case, the output from adder ALU 63 on line 57 corresponds to equation 2 and includes both of its terms. The result goes back into the respective pixel locations in frame store 50.

The system thus far described would be suitable for reducing noise in proportion to motion in ordinary monochrome television wherein the magnitudes of the digitized pixel signals are linearly related to the brightness of the particular image area to which the pixel relates. What has been accomplished thus far, generally parallels what was achieved in cited U.S. Pat. No. 4,064,530. There are, however, some differences in the electronic implementation in that motion is detected with an ALU 24 comparison means in the present disclosure and the value of K and the factor it multiplies is determined by using a look-up table or PROM 61. A further difference in concept is that, in the present invention, K is selected on the basis of the value of the live image or live pixel itself and not just on the basis of the difference between the live and stored pixel values as in the prior art. The reason for this was alluded to earlier and will now be discussed in greater detail to bring out an important novel feature for making the noise reduction means highly beneficial in an x-ray system.

Figures 2, 3:
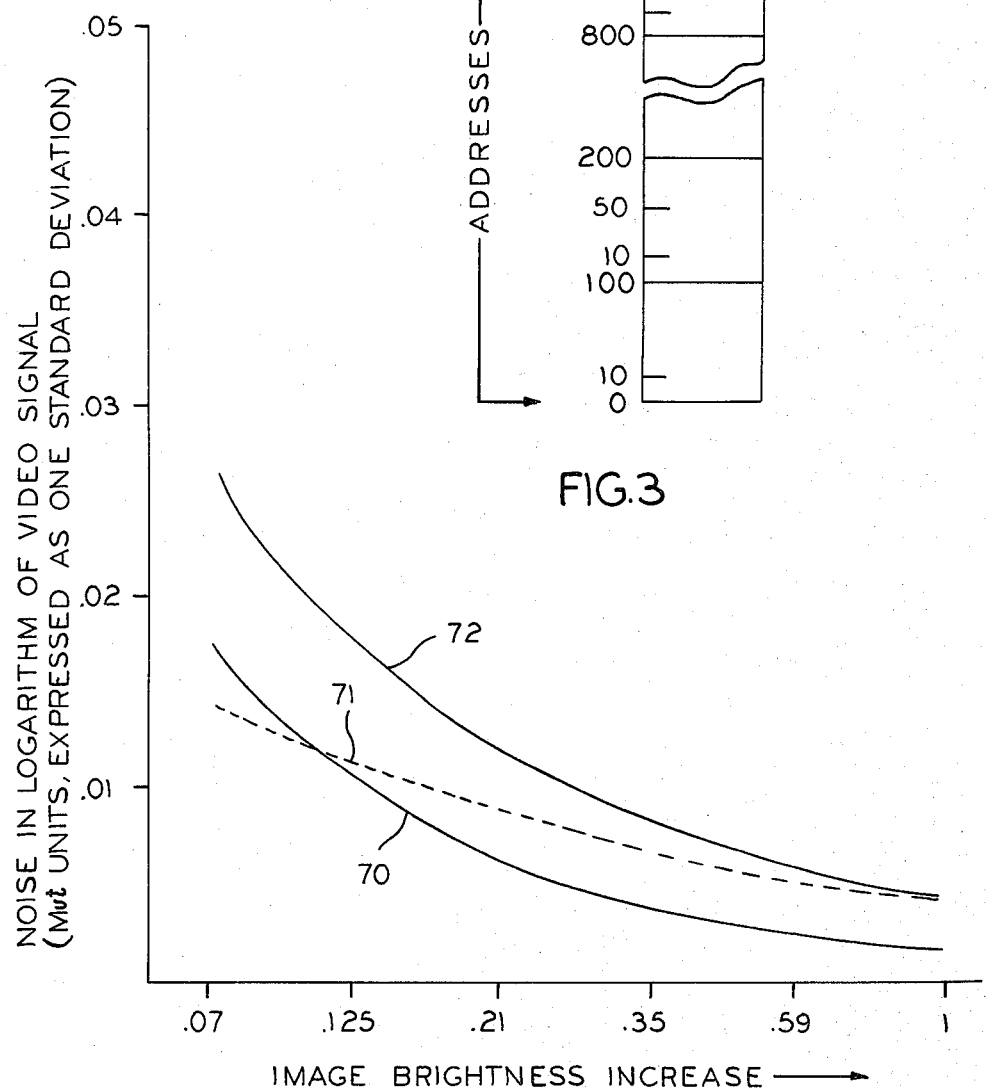
FIG. 2 is a graph showing the relationship between image brightness and noise in the logarithm of the video signals, which graph is useful for explaining operation of the invention.
FIG. 3 is a symbolic representation of a look-up table that is used to obtain noise reduction proportional to the amount of motion and to the brightness or darkness of zones in the x-ray image.

As previously mentioned, images in an x-ray video system have noise levels that depend on the brightness level as a result of the video signals having to be amplified logarithmically before or after being digitized. As stated, logarithmic amplification is required in order to get signals that are proportional to attenuation of the x-ray beam. Logarithmic amplification also changes the character of the noise. This phenomenon can be appreciated by considering FIG. 2 which is a graph of the noise in the logarithm of the video signals in terms of $\mu t$ units expressed as one standard deviation as ordinates and image brightness as abscissas. Mu is the coefficient of x-ray absorption and t is the distance in the object to which the x-ray beam is penetrated. In FIG. 2 a typical noise in the logarithmic video signal vs. brightness curve shows how noise in the video system varies with brightness and signal level. As can be seen from inspection, the video noise is high where image brightness is low and video noise decreases as image brightness increases. This kind of noise may be looked upon as being inherent in the electronics of the signal processing system. Another curve marked 71 shows how noise due to statistical fluctuation of x-ray photon production and absorption is also high where image brightness is low and low where image brightness is high. This kind of noise results mainly from the randomness of photon detection by the x-ray image intensifier tube. Both kinds of noise, as is well known, are manifested as mottling in the displayed image. Without noise reduction, the effect is especially noticeable in static parts of the displayed scene. The total effect of both kinds of noise is obtained by squaring the ordinate value of the curves 70 and 71 and taking the square root of the sum of the squares. This results in a curve 72 which represents the total noise. As is evident from inspection, total noise also is greatest in the low image brightness areas and decreases non-linearly with increasing image brightness.

In accordance with the invention, noise averaging or noise reduction is reduced for pixels in white regions, since the noise is smaller there in comparison to the dark regions. By increasing the amount of noise reduction where possible in the darker regions, a sharper image is obtained. The objective is to adjust the motion detector in a way such that there will be sharpness where edges occur in the bright regions. In the dark regions, on the other hand, the noise is very high and the sharp edges wil be indistinguishable anyway. In that case, greater noise reduction is appropriate and a little penalty in sharpness is acceptable.

The unique feature of increasing the noise reduction with increasing image brightness and decreasing noise reduction with decreasing brightness or live signal level involves the use of another delay device 68 in FIG. 1. The input to this delay is the live video signal that is output from the A/D converter 22 by way of line 23. The output of delay 68 of line 67 is input to the address former 69 which is associated with PROM LUT 61. Thus, there are 2 inputs to the address former 69, a live video signal by way of line 67 and the Live-Store difference signal output from motion detector ALU 24 on line 60. The live video signal can now be used as the second part of a composite address. As stated, K depends on the difference between live and stored video signals and on the live signal. Suppose, by way of example, that the difference between two digitized pixel values on the output 60 of comparison means 24 is 10 in decimal numbers. Assume that this difference resulted from subtracting the decimal value equivalents of the digital number 490 from 500 or, it could be the result of subtracting 890 from 900 or 10 from 20. This assumes that, in this example, the analog video signals are converted to greater than 9-bit precision. With former approaches, K would be the same for all three cases. However, in accordance with the invention, it is recognized that noise is much worse in the dark regions of the image than it is in the whiter regions. Hence, a smaller value of K is used. As K gets smaller, the noise is reduced more and more. In the white regions, it is desired for K not to be so small in which case less noise reduction is acceptable and more sensitivity to motion can be obtained.

The desired result is implemented in FIG. 1 by using the PROM or LUT 61 to generate K based on both the difference signal which is coming from the motion detector 24 and the live video signal which is coming through delay 68. These two digital numbers are used in the address former 69 to generate an address in the LUT. The address consists of two parts as has been mentioned. One corresponds to the live digitized pixel signals passing through delay 68 and the other, which was mentioned earlier, corresponds to the difference between live and stored pixel value passing through motion detector ALU 24. The delay device 68 is primarily for enabling the stored digital pixel signals from frame store 50 to be kept in phase with the corresponding live video signals. In other words, delay 68 accounts for the propagation delay resulting from motion detector ALU 24. The look-up table in PROM 61 is shown symbolically in FIG. 3. In this illustration, it is divided into 10 blocks of stored data. Each block is addressable as a page and locations are addressable in each page. One of the address components of the LUT is the live video signal. Assuming that 10-bit digitization is used, various live signals would fall within one of the ranges 0-100, 100-200, and so forth. Thus, the live video signal portion of the composite address can be used to address the page. The contents of the page addresses would then be K times the difference which was K times Live-Stored. The look-ups are replicated in the various pages by slightly changing the mapping inside of the look-up. Thus, the live value address points to a page in the table and the difference points to which exact value of K to use. Hence, if, as in the previously given example, the difference is equal to 10 it could be in any one of the LUT blocks or pages but the correct one for a stored value of K is chosen because the live pixel value in the composite address pointed to the proper block in the table. Some of the differences of 10 are symbolized by the lines marked 10 in FIG. 3 within various generally 100 step pixel value ranges. Another difference of 50 is marked similarly. As explained, composite addressing determines the brightness level range, dictated by the live video pixel value, to which the illustrated and any other difference of $K(Live_n - Stored_{n-1})$ relates. With the illustrated arrangement, a unique amount of noise reduction would be provided for 10 different brightness ranges. Of course, finer gradations, that is more values of K or smaller variations in the brightness level could be obtained by simply further subdividing the pages one or more times. In such case, the live signal values would point to a greater number of table subdivisions and the difference part of the address could still point to the exact value of K to use. It is possible, of course to drop some of the least significant bits from each part of the composite address while still permitting addressing a significant number of pages and locations within the pages.

Although a preferred embodiment for varying noise reduction in relation to image brightness has been described in detail, such description is intended to be illustrative rather than limiting, for the invention may be variously embodied and is to be limited only by the claims which follow.

I claim:

1. In a system including means for converting picture elements (pixels) comprising an image to analog video signals, means for converting the analog video signals to live digital video pixel signals, and improved apparatus for reducing the effect of noise in a television display of the image, comprising:
   a full image frame memory having locations for storing digitized video pixel signals that compose an image frame, said memory having input and output means for pixel signals,
   motion detector means comprising means for comparing the stored video pixel signals that are output from the memory in succession with corresponding live digital pixel signals that are destined for the frame memory locations from which the respective stored video signals were obtained, said means for comparing having output means for difference signals representative of the difference between said stored and live video signals,
   means for generating a controllable fraction, K, based on the value of said difference signals and on the value of the live video pixel signal,
   said fraction, K, being smaller for a low intensity live video pixel signal, thereby making said fraction, K, dependent on said live video pixel signal intensity,
   means for summing a controllable fraction $(1-K)$ of the stored pixel value with a corresponding controllable fraction K of the live pixel value, and
   means for coupling the result of the summing of said fractions to the input of the frame memory for being stored in the location from which the aforesaid stored video pixel signal was obtained.

2. The apparatus in claim 1 wherein the noise reducing apparatus is governed by the equation:

$$Store_n = Store_{n-1} + K(Live_n - Store_{n-1})$$

where Store n is the processed signal output from said summing means to a memory pixel location, Store $n-1$ is the averaged value of the pixel signal in a location, $Live_n$ is the live digitized signal corresponding to the pixel location and K is given values ranging between 0 and 1 such that if motion above a predetermined threshold is detected in a pixel, K has a value of 1 and the $Live_n$ signal replaces the stored signal in the memory location to which the pixel relates.

3. The apparatus defined in claim 2 wherein as K increases, the amount of noise reduction decreases.

4. The apparatus defined in claim 1 wherein said comparison means constituting the motion detector is an arithmetic logic unit.

5. The system defined in claim 1 including digital-to-analog converter means having output means and input means coupled to the output means of said memory and being operative to convert the pixel signals in succession to corresponding analog video signals that are output from the converter for controlling a television monitor to display the image.

6. Apparatus for reducing noise in a system including means for converting an x-ray image to corresponding analog video signals, means for amplifying said video signals and any noise included therewith logarithmically to obtain video signals whose magnitudes are substantially linearly related to the intensities of the picture elements (pixels) that compose the x-ray image and means for converting the logarithmic analog video signals to live video digital pixel signals each of which corresponds to a discrete pixel and to the intensity thereof, and the improvement for reducing the effect of noise in a television display of the image, comprising:
   a full frame memory having locations for containing digitized video pixel signals that compose an image frame, said frame memory having input and output means for pixel signals,
   motion detector means comprised of means for comparing the stored digital video pixel signals that are output from the memory in succession with corresponding live digital pixel signals that are destined for the memory locations from which the stored signals were obtained, said means for comparing having output means for digital difference signals representative of the difference between said stored and live signals,
   look-up table means having addressing means and output means and a plurality of locations storing digital signals corresponding to the respective values of the difference signals that are output from the comparison means multiplied by K, where the K's are predetermined values corresponding to the amount of noise reduction desired in relation to the brightness levels of pixels and the product of K times the difference signal is representative of brightness level and the amount of motion that has been indicated by the value of said difference signal and said product being output from said look-up table means,
   said live signals corresponding to brightness of the pixel in process and said difference signals resulting from comparison and corresponding to motion constituting addresses for said addressing means to select and output a value of K times the difference signal resulting from comparison that corresponds to both said amount of noise reduction for the brightness level and said amount of motion, summing means having output means coupled to the input of said memory and having one input for the output from said look-up table and having another input, said summing means being operative to add the stored pixel signals to the other inputs and deliver the result to the memory location from which the stored pixel signal was obtained.

7. The apparatus in claim 6 wherein the noise reducing apparatus is governed by the equation:

$$Store_n = Store_{n-1} + K(Live_n - Store_{n-1})$$

where $Store_n$ is the processed signal output from said summing means to a memory pixel location, $Store_{n-1}$ is the averaged value of the pixel signal in a location, $Live_n$ is the live digitized signal corresponding to the pixel location and K is given values ranging between 0 and 1 such that if motion above a predetermined threshold is detected in a pixel, K has a value of 1 and the $Live_n$ signal replaces the stored signal in the memory location to which the pixel relates.

8. The apparatus defined in claim 7 wherein as K increases, the amount of noise reduction decreases.

9. The apparatus defined in claim 6 wherein said comparison means constituting the motion detector is an arithmetic logic unit.

10. The system defined in claim 6 including digital-to-analog converter means having output means and input means coupled to the output means of said memory and being operative to convert the pixel signals in succession to corresponding analog video signals that are output from the converter for controlling said television monitor to display the image.

* * * * *

UNITED STATES PATENT AND TRADEMARK OFFICE
CERTIFICATE OF CORRECTION

PATENT NO. : 4,367,490
DATED : January 4, 1983
INVENTOR(S) : Stephen J. Riederer It is certified that error appears in the above—identified patent and that said Letters Patent is hereby corrected as shown below:

Column 10, Claim 2, Line 6, "store n" should read --$store_n$--

Column 10, Claim 2, Line 7, "store n-1" should read --$store_{n-1}$--

Signed and Sealed this

Fifth Day of April 1983

[SEAL]

Attest:

GERALD J. MOSSINGHOFF

Attesting Officer

Commissioner of Patents and Trademarks